United States Patent
Wang et al.

(10) Patent No.: US 8,080,981 B2
(45) Date of Patent: Dec. 20, 2011

(54) INTERLEAVED-PWM POWER MODULE SYSTEM AND METHOD WITH PHASE-LOCKING OPERATION

(75) Inventors: Hsueh-Cheng Wang, Taoyuan County (TW); Ying-Sung Chang, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 111 days.

(21) Appl. No.: 12/614,073

(22) Filed: Nov. 6, 2009

(65) Prior Publication Data

US 2011/0110130 A1    May 12, 2011

(51) Int. Cl.
*G05F 3/16*    (2006.01)
(52) U.S. Cl. ............ 323/225; 363/65; 323/272; 323/283
(58) Field of Classification Search .................... 363/65, 363/67, 69, 71, 72; 323/225, 272, 285
See application file for complete search history.

(56) References Cited

U.S. PATENT DOCUMENTS

| | | | |
|---|---|---|---|
| 7,653,757 B1 * | 1/2010 | Fernald et al. | 710/3 |
| 2004/0123167 A1 * | 6/2004 | Chapuis | 713/300 |
| 2007/0075691 A1 * | 4/2007 | Burstein et al. | 323/272 |
| 2007/0124612 A1 * | 5/2007 | Chapuis et al. | 713/300 |
| 2009/0257257 A1 * | 10/2009 | Adragna et al. | 363/65 |

* cited by examiner

*Primary Examiner* — Gary L Laxton
*Assistant Examiner* — Gustavo Rosario Benitez
(74) *Attorney, Agent, or Firm* — Muncy, Geissler, Olds & Lowe, PLLC

(57) ABSTRACT

An interleaved-PWM power module system and method for operating the same are disclosed. The power system includes at least two power modules, each of which has a specific ID number. The power module with an extreme value of the specific ID number is set as a master power module and the remaining power modules are set as slave power modules. The master power module sends the sync signal to all of the slave power modules. Each of the slave power modules performs a phase-locking operation with reference to a specific phase offset to generate a frequency switching signal, where the frequency switching signal is synchronized with the sum of the sync signal and the phase offset for each slave power module. The power module outputs the frequency switching signal for PWM signal generation.

10 Claims, 6 Drawing Sheets

INTERLEAVED-PWM POWER MODULE SYSTEM AND METHOD WITH PHASE-LOCKING OPERATION

BACKGROUND OF THE INVENTION

1. Field of the Invention

The present invention relates to a PWM power module system and a method for operating the same, and more particularly to an interleaved-PWM power module system and a method for operating the same that is implemented by performing a phase-locking operation.

2. Description of Prior Art

In order to meet the development tendency of electronic products, that is, features of the produces tends to high power, high speed, and small size, the power densities of the electronic products increase as a result of their smaller volume. Also, the electromagnetic interference (EMI) noise is generated from the electronic components due to layout of the electronic components in a small layout area. The EMI disturbance may interrupt, obstruct, or otherwise degrade or limit the effective performance of the circuit, but have become more of problems as design of electronic apparatuses.

EMI is unwanted effects in the electrical system due to electromagnetic radiation and electromagnetic conduction. Electromagnetic radiation and electromagnetic conduction are differentiated by the way an EM field propagates. The two main types of EMI are conducted and radiated. Conducted EMI is caused by the physical contact of the conductors as opposed to radiated EMI which is caused by induction without physical contact of the conductors. For example, conducted EMI is passed over wires and cables from a source or emitting to the receiver, and more particularly, the conducted EMI could be interfered mutually between wires in an electrical apparatus. The most common solution to radiated EMI is electromagnetic shielding and grounding. Accordingly, an EMI filter is installed between the AC source and the electronic circuits to restrain the EMI. The EMI filters can be provide to efficiently restrain the circuit noise, and to increase anti-interference capability and system reliability for the electronic apparatuses. Hence, the EMI filters are widely applied to electronic measurement instruments, computer room facilities, switching power apparatuses, control and measurement system, and so on.

The prior art PWM power controller was provided with an EMI filter for each of the power modules in order to reduce input ripple current and output ripple current. However, the provision of the EMI filters increases costs and it is difficult to expand the power modules.

U.S. Pat. No. 5,861,734 disclosed a control system for interleaved converters. The converter circuit includes two interleaved boost circuits, and the control system uses a single PWM controller, which operates at a fixed switching frequency with two 180 degree out-of-phase outputs, to control the switches in both of the interleaved boost circuits. The control system is mainly formed by a PWM controller, a current amplifier and filtering circuit, and a voltage feedback control circuit. A current signal is produced by the current amplifier and a filtering circuit, and a feedback voltage is generated by the voltage feedback control circuit. More particularly, switches of the two interleaved boost circuits are controlled by the PWM controller according to the current signal and the feedback voltage. By regulating the boost converter switches, the single PWM controller is able to ensure synchronization and current sharing while tightly regulating the output voltage and improving the input power factor of the converter circuit.

However, the prior art converter circuit needs to be controlled by multiple interleaved boost circuits to increase switching losses of the power semiconductor devices and increase capacitor components of the EMI filters. In addition, the interleaved boost circuits are not able to provide normal operation of synchronization and current sharing as long as only one of the interleaved boost circuits is faulted.

Hence, an interleaved-PWM power module system and a method for operating the same are disclosed to provide a phase offset calculation according to the connection and sequence of a master power module and slave power modules to provide a robust full-interleaved control and flexibly expandability to reduce switching losses of the power semiconductor devices and decrease input capacitors and the output capacitors of the EMI filters to reduce costs.

SUMMARY OF THE INVENTION

In order to solve the above-mentioned problems, the present invention provides an interleaved-PWM power module system. The interleaved-PWM power module system includes at least two power modules. Each of the power modules has a communication interface, an AC-to-DC converter, and a digital signal processor. The communication interface receives and sends a sync signal to communicate the master power module and the slave power modules. The AC-to-DC converter converts an AC voltage into a DC voltage. The digital signal processor is connected to the communication interface and the AC-to-DC converter to digitize analog signals. The digital signal processor includes a phase-locked loop (PLL) unit and a pulse width modulation (PWM) signal generator. The phase-locked loop unit receives the sync signal and performs a phase-locking operation with reference to a specific phase offset to generate a frequency switching signal. The PWM signal generator is connected to the phase-locked loop unit to receive the frequency switching signal and generate a PWM control signal to drive the AC-to-DC converter.

In order to solve the above-mentioned problems, the present invention provides a method for operating the interleaved-power module system. The power module has at least two power modules, and each of the power modules has a specific ID number and a digital signal processor. The operation steps of the method includes as follows. First, the power module with an extreme value of the specific ID number is set as a master power module and the remaining power modules are set as slave power modules. Afterward, the master power module sends a sync signal to all of the salve power modules. Afterward, the digital signal processor of each of the slave power modules performs a phase offset calculation to produce different phase offsets to all of the slave power modules. Also, each of the slave power modules outputs a frequency switching signal after performing the phase offset calculation and the frequency switching signal is synchronized with the sum of the sync signal and the phase offset for each slave power module. The digital signal processor of each power module outputs the frequency switching signal to control a corresponding PWM control signal.

Accordingly, the interleaved-PWM power module system and a method for operating the same are provided to implement a robust full-interleaved control and flexible expandability to reduce switching losses of the power semiconductor devices and decrease input capacitors and the output capacitors of the EMI filters to reduce costs.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1A:
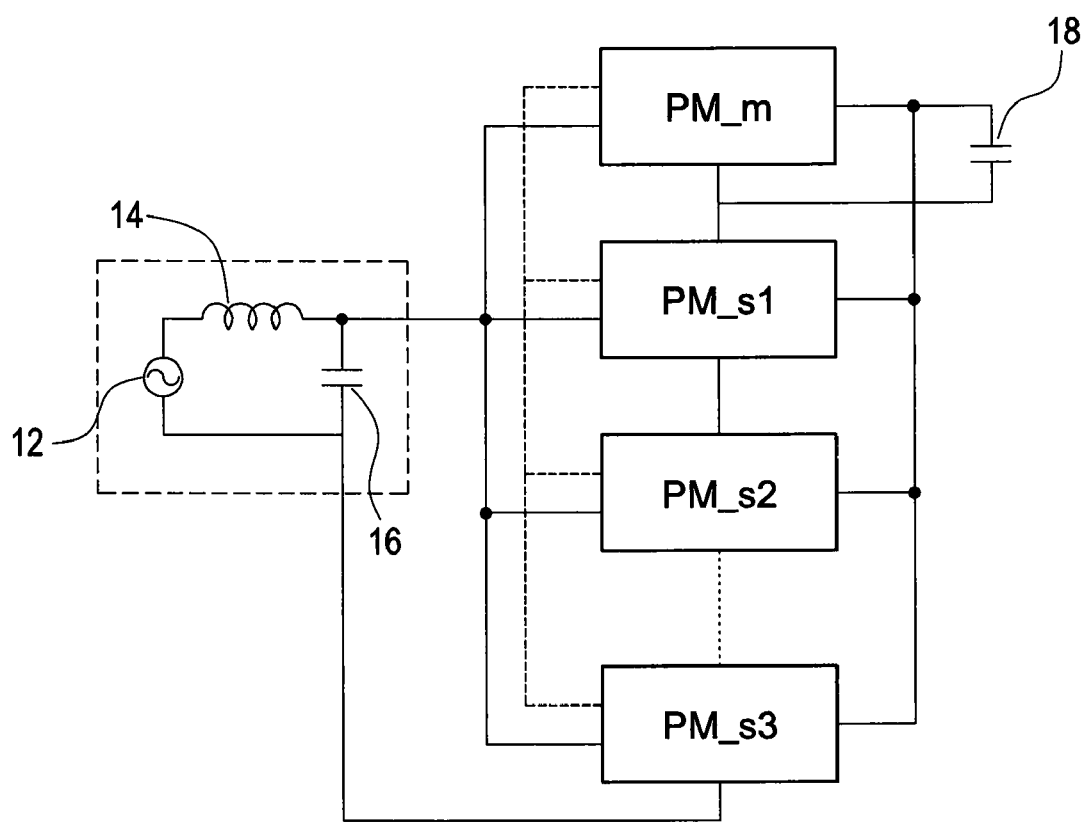
FIG. 1A is a block diagram of a power module system according to a preferred embodiment of the present invention.

Reference will now be made to the drawing figures to describe the present invention in detail. Reference is made to FIG. 1A which is a block diagram of a power module system according to a preferred embodiment of the present invention. An AC power 12 is supplied to a plurality of power modules (PM_m, PM_si, i=1, 2, . . . ) through an EMI filter with an inductor 14 and a capacitor 16. The power modules PM are composed of a master power module PM_m and at least one slave power module PM_si, i=1, 2, . . . . More particularly, each of the power modules has a specific ID number as a reference for a phase offset calculation. The PWM control signals of the slave power modules PM_s are controlled by the master power module PM_m to be mutually interleaved. Also, the power modules output supplied voltage to an output terminal 18.

Figure 1B:
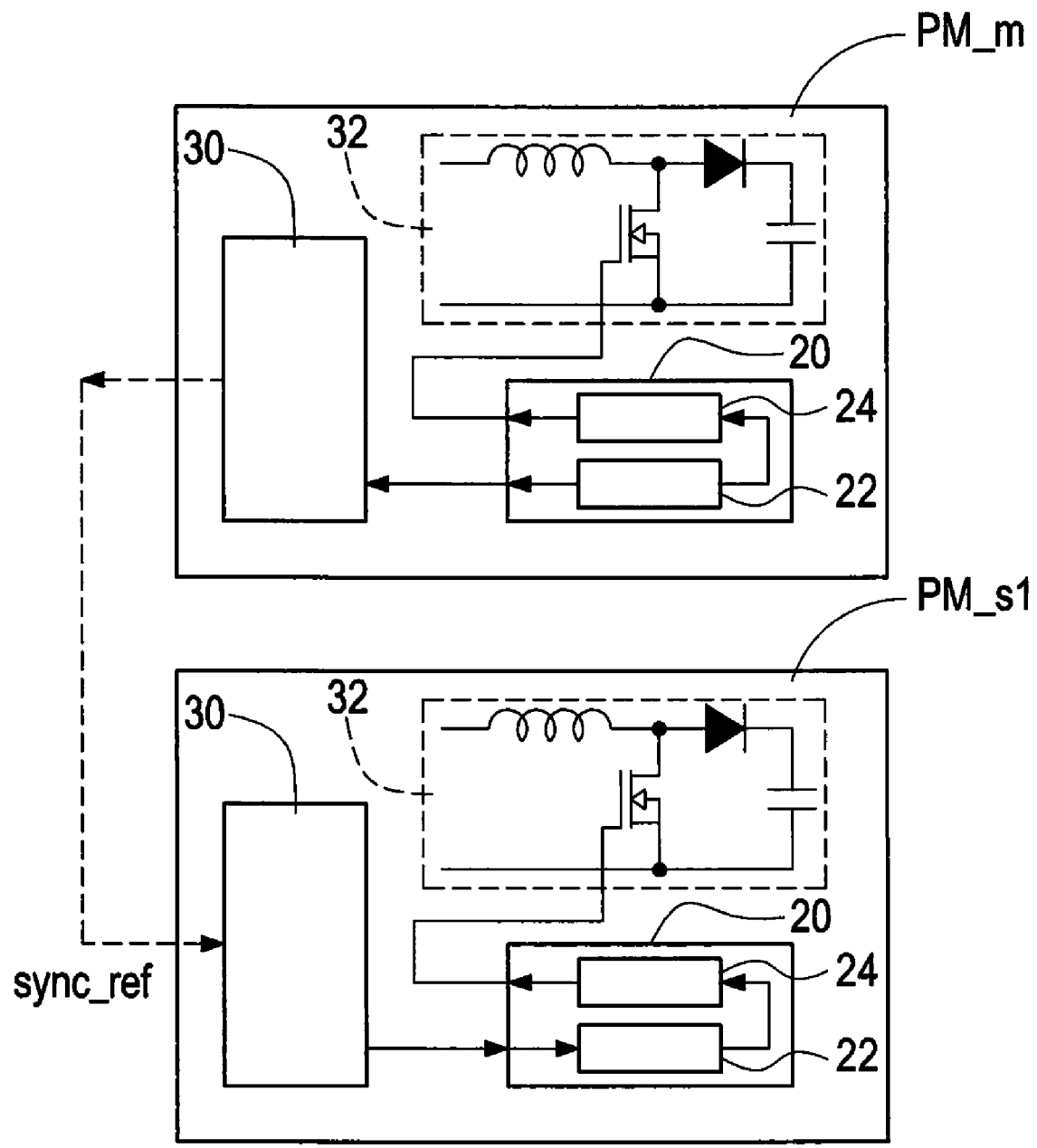
FIG. 1B is a schematic view of inside a power module.

Because each of the power modules has the same hardware, single power module (such as a slave power module PM_s) is explained as follows. Reference is made to FIG. 1B which is a schematic view of inside a power module. Each of the power modules PM includes a communication interface 30, an AC-to-DC converter 32, and a digital signal processor 20. The communication interface 3-0 receives and sends a sync signal sync_ref to communicate the master power module PM_m and the slave power modules PM_s. The AC-to-DC converter 32 converts an AC voltage into a predetermined DC voltage. The digital signal processor 20 is connected to the communication interface 30 and the AC-to-DC converter 32 to produce a PWM control signal to drive the AC-to-DC converter 32. In addition, the digital signal processor 20 further includes a phase-locked loop unit 22 and a PWM signal generator 24. The phase-locked loop unit 22 receives the sync signal sync_ref and performs a negative feedback phase-locking operation with reference to a corresponding phase offset of a specific ID number PM_id to generate a frequency switching signal. The PWM signal generator 24 is connected to the phase-locked loop unit 22 to receive the frequency switching signal (to be an input frequency of the PWM signal generator 24) and generated the PWM control signal to drive a transistor switch (not labeled) of the AC-to-DC converter 32.

Figure 2:
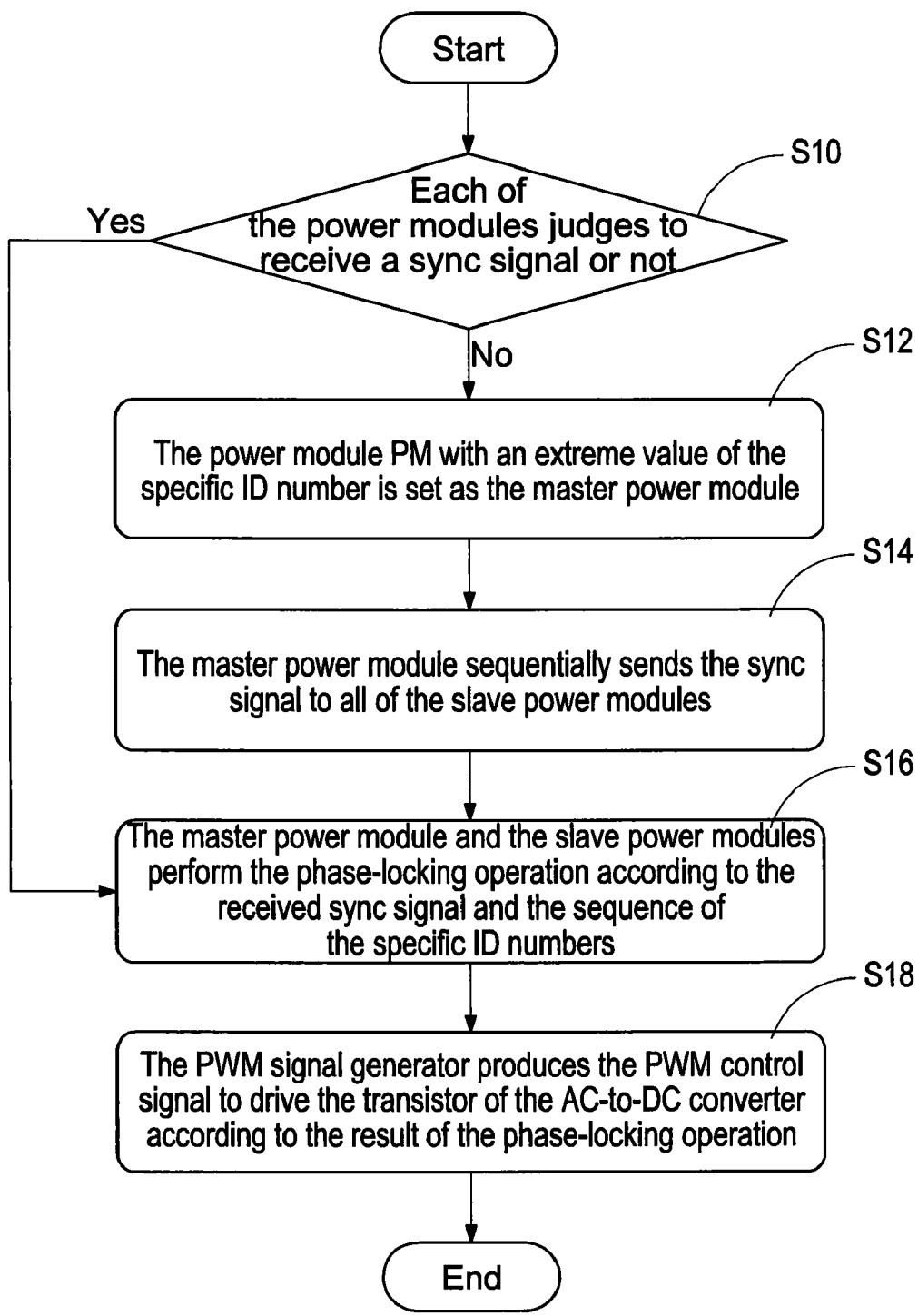
FIG. 2 is a flowchart of operating the power module system.

Reference is made to FIG. 2 which is a flowchart of operating the power module system. Each of the power modules PM judges to receive a sync signal sync_ref or not (S10) when the system startups. More particularly, each of the power modules PM has a specific ID number.

The power module PM with an extreme value (the minimum or maximum value) of the specific ID number is set as the master power module PM_m and the remaining power modules PM are set as the slave power modules PM_s (S12) when each of the power modules PM does not receive the sync signal in the step (S10). Afterward, the master power module PM_m sequentially sends the sync signal sync_ref to all of the slave power modules PM_s (S14). Afterward, the master power module PM_m and the slave power modules PM_s perform the phase-locking operation according to the received sync signal sync_ref and the sequence of the specific ID numbers (S16).

Finally, the PWM signal generator 24 of the digital signal processor 20 of each power module PM produces the PWM control signal to drive the transistor of the AC-to-DC converter according to the result of the phase-locking operation (S18).

More particularly, the ID number PM_id of the master power module PM_m will be recorded. Also, the power module PM with the recorded ID number PM_id will be automatically defined as the master power module PM_m when the system boosts up next time. Hence, each of the slave power module PM_s can receive the sync signal sync_ref in the step (S10) and afterward to directly perform the step (S16).

When the present master power module PM_m has a boosting fault, a new master power module PM_m is selected from the remaining un-faulted power modules PM. Similarly, the remaining power module PM with the minimum value (or the maximum value) of the specific ID number is set as the new master power module PM_m. More particularly, the signal operations are processed through the digital signal processors in side the power modules. The detailed description of these operation steps will be made hereinafter.

Figure 3:
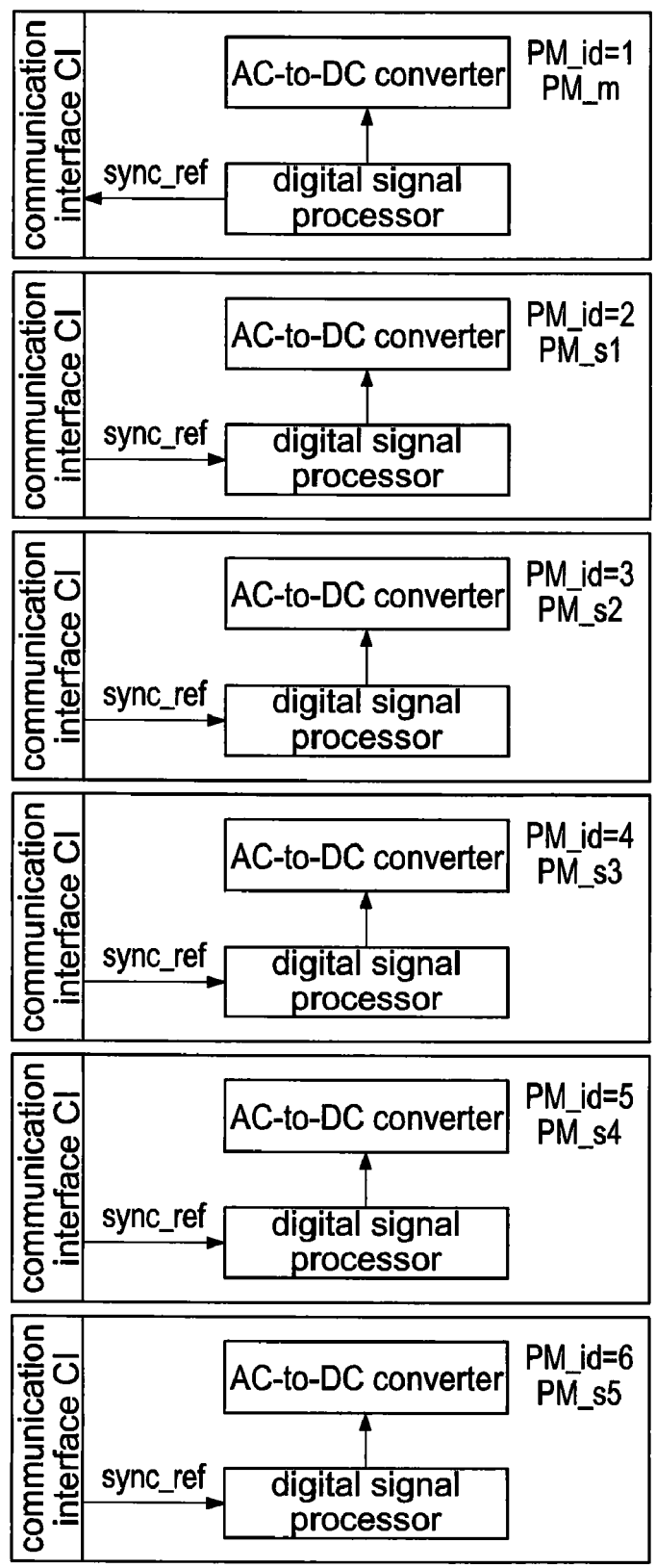
FIG. 3 is a schematic view of operating multiple power modules according to the preferred embodiment.

Reference is made to FIG. 3 which is a schematic view of operating multiple power modules according to the preferred embodiment. In this embodiment, six power modules are exemplified to demonstrate the procedure of performing the power modules, and each of the six power modules PM has a specific ID number PM_id, namely, the ID numbers are sequentially through PM_id=1 to PM_id=6. Also, signals of the power modules are processed through the digital signal processors inside the power modules. In the embodiment, the frequency of the sync signal is 54 KHz.

In this example, the master power module with the minimum value of the specific ID number is exemplified to demonstrate the present invention. Namely, the power module PM (the ID number PM_id is 1) is set as the master power module PM_m, and the remaining power modules PM are set as the slave power modules PM_s (the ID number PM_id are 2, 3, . . . , and 6). Also, the slave power module PM_s (the ID number PM_id are 2, 3, . . . , and 6) are sequentially set through a first slave power module PM_s1 to a fifth slave power module PM_s5. However, sequence of the slave power modules is for demonstration and not for limitation of the present invention.

Afterward, the sync signal sync_ref is sequentially sent from the master power module PM_m to all of the slave power modules PM_s through a communication interface CI. The communication interface CI can be a controller area network (CAN) interface. More particularly, the CAN interface is a multi-master broadcast serial bus standard, which can used as an embedded communication system for providing high-security and high-efficiency real-time control.

The master power module PM_m sends the sync signal sync_ref to all of the slave power modules PM_s when defining the connection and the sequence of the master power module and the slave power modules. Afterward, the digital signal processor of each of the slave power modules PM_s performs a phase offset calculation according to the sync signal sync_ref and the sequence of the specific ID numbers. Hence, different phase offsets are produced correspond to the slave power module PM_s. The slave power module PM_s provides accurate interleaved control phase-locked control according to switching frequency and the corresponding phase offset thereof. The detailed description of the phase-offset operation will be made hereinafter.

Finally, the PWM signal generator 24 of the digital signal processor 20 of each power module PM produces the PWM control signal to drive the transistor of the AC-to-DC converter according to the result of the phase-locking operation to implement the interleaved-PWM power module control system.

Figure 4:
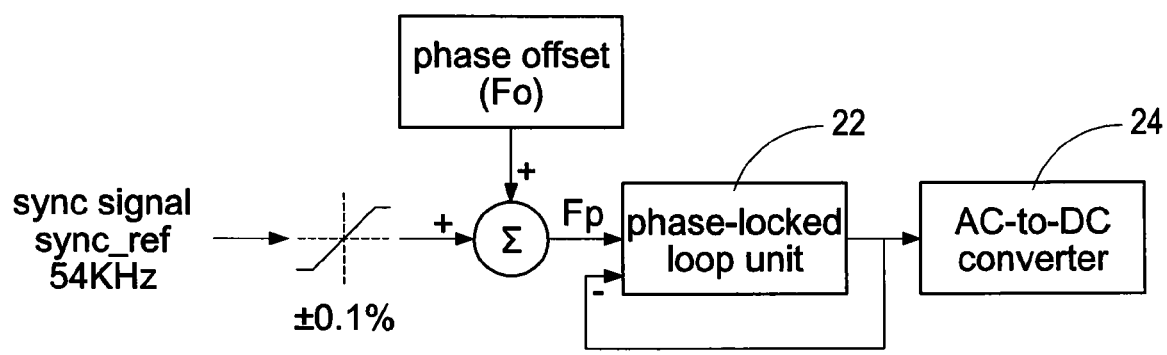
FIG. 4 is a schematic view of performing a phase-locking operation to the power modules.

Reference is made to FIG. 4 which is a schematic view of performing a phase-locking operation to the power modules. As the above mention, the sync signal sync_ref is sequentially sent from the master power module PM_m to all of the slave power modules PM_s through a communication interface CI. The frequency variation of the sync signal sync_ref is limited under a pre-determined error margin percentage to provide a sync signal reference for the phase offset calculation. In the embodiment, the pre-determined error margin percentage is ±0.1%. First, each of the slave power module PM_s produces a pre-determined phase offset Fo according to the sequence of the specific ID numbers of the slave power module PM_s. Afterward, the pre-determined phase offset Fo is added to the limited sync signal sync_ref to produce an input signal Fp to the phase-locked loop unit 22. Also, the phase-locked loop unit 22 of each of the slave power module PM_s performs a closed-loop negative-feedback phase offset calculation with reference to the received input signal Fp. The frequency and phase of the output signal (not labeled) are locked according to the frequency and phase of the input signal Fp to generate a frequency switching signal for the PWM signal generator to provide accurate interleaved control phase-locked control. More particularly, central point of the PWM control signal of each power modules is mutually interleaved.

In this embodiment, six power modules PM (namely, one master power module PM_m and five slave power modules PM_s) are exemplified to demonstrate the procedure of performing the power modules. It assumes that the power module PM (the ID number PM_id is 1) is set as the master power module PM_m. Hence, the power module PM (the ID number PM_id is 2) is the first slave power module PM_s1, the power module PM (the ID number PM_id is 3) is the second slave power module PM_s2, and so on. The first slave power module PM_s1, the second slave power module PM_s2, . . . , to the fifth slave power module PM_s5 generate the pre-determined phase offset Fo, and the pre-determined phase offset Fo is added to the limited sync signal sync_ref to produce an input signal Fp to the phase-locked loop unit 22.

The phase-locked loop unit 22 of the first slave power module PM_s1 receives the input signal Fp, wherein the phase of the input signal Fp equals the pre-determined phase offset Fo adds the limited sync signal sync_ref (namely, Fp=sync_ref+Fo). Also, the phase-locked loop unit 22 of the second slave power module PM_s2 receives the input signal Fp, wherein the phase of the input signal Fp equals two times of the pre-determined phase offset Fo adds the limited sync signal sync_ref (namely, Fp=sync_ref+2*Fo). Hence, the phase-locked loop unit 22 of the fifth slave power module PM_s5 receives the input signal Fp, wherein the phase of the input signal Fp equals five times of the pre-determined phase offset Fo adds the limited sync signal sync_ref (namely, Fp=sync_ref+5*Fo). Also, the phase-locked loop unit 22 of each of the slave power module PM_s performs a closed-loop negative-feedback phase offset calculation with reference to the received input signal Fp. Accordingly, the phase-locked loop unit 22 of each of the slave power modules PM_s receives the input signal Fp and the closed-loop negative-feedback calculated input signal Fp to generate a frequency switching signal for the PWM signal generator to provide accurate interleave control phase-locked control.

By calculating pre-determined phase offset Fo and performing the closed-loop negative-feedback phase offset calculation to produce different phase offsets to all of the slave power modules. Hence, each of the slave power modules PM_s provides accurate interleaved control phase-locked control by adding the switching frequency of the slave power module PM_s to the corresponding phase offset.

In addition, the phase offset calculation is similar to the above-mentioned steps when the master power module with the maximum value of the specific ID number is exemplified to demonstrate the present invention. The main difference is that the power module with the maximum of the specific ID number is set as the master power module.

Figure 5:
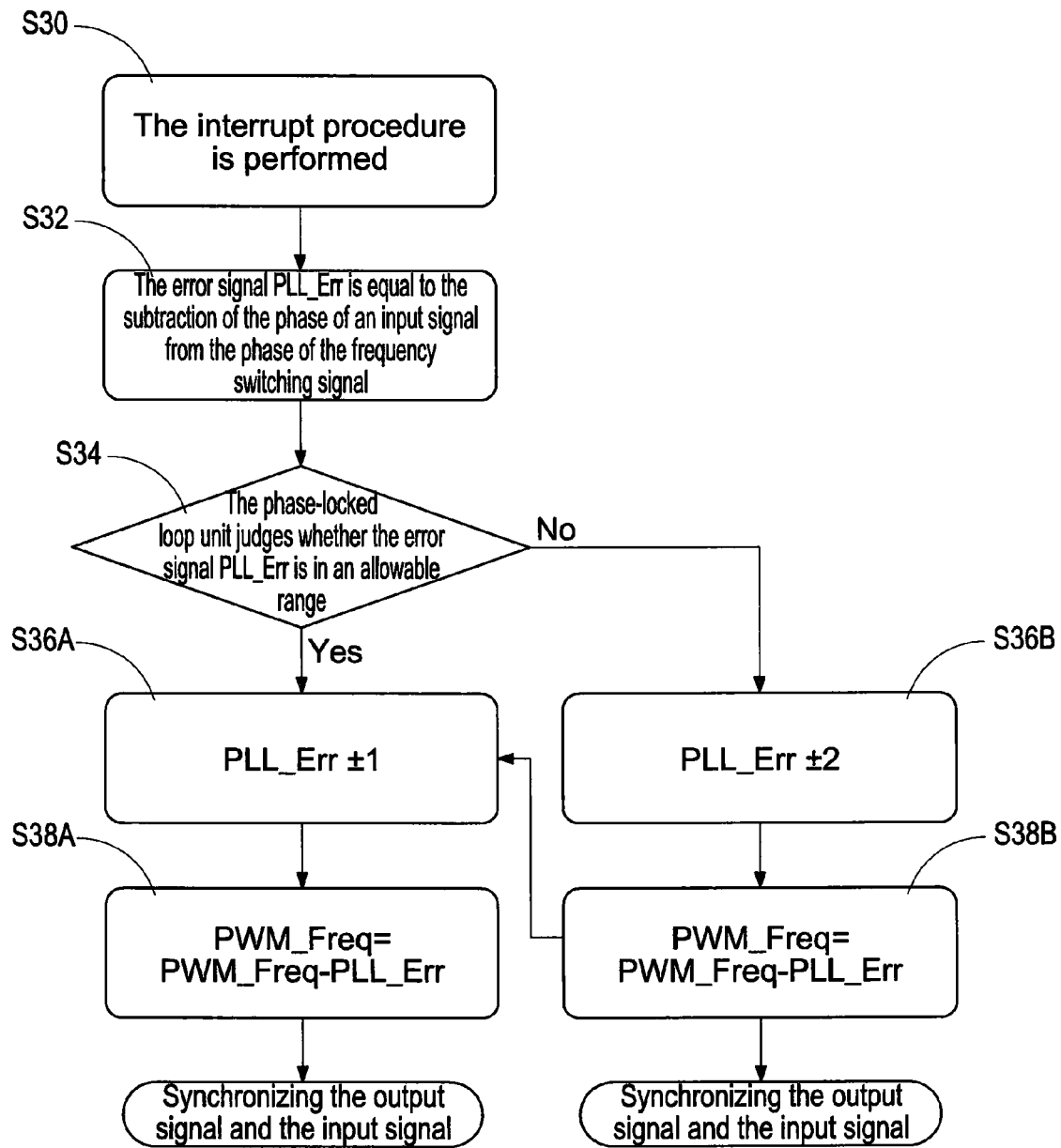
FIG. 5 is a flowchart of operating phase-locked loop units.

Reference is made to FIG. 5 which is a flowchart of operating phase-locked loop units. When the interrupt procedure is performed (S30), the phase-locked loop unit will re-define an error signal PLL_Err. The error signal PLL_Err is equal to the subtraction of the phase of an input signal Fp from the phase of the frequency switching signal (S32). Namely, the input signal Fp is equal to the sum of the phase offset Fo and the limited sync signal sync_ref. Afterward, the phase-locked loop unit judges whether the error signal PLL_Err is in an allowable range (S34). The error signal PLL_Err is adjusted by using a smaller slew rate when the error signal PLL_Err is in the allowable range (S36A). In addition, the error signal PLL_Err is adjusted by using a larger slew rate when the error signal PLL_Err is not in the allowable range (S36B). Afterward, frequency of the frequency switching signal PMW_Freq is adjusted (S38A, S38B) according to the adjusted error signal PLL_Err to synchronize the output signal and the input signal Fp.

In conclusion, the present invention has following advantages:

1. Each of the power modules has a specific ID number and corresponds to different phase offsets to provide the interleaved phase-locked control.

2. The power modules can communicate with other power module through the communication interface and further support expandable power modules.

3. Each of the power modules can be set as the master power module to send the sync signal to increase robustness of the power module system.

4. The power modules are controlled interleaved to reduce input ripple current and output ripple current and decrease input capacitor and the output capacitor of the EMI to reduces.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An interleaved-PWM power module system having at least two power modules, and one of the power modules is a master power module and the remaining power module are slave power modules, each of the power modules comprising:
 a communication interface receiving and sending a sync signal to communicate the master power module and the slave power modules;
 an AC-to-DC converter converting an AC voltage into a predetermined DC voltage; and
 a digital signal processor connected to the communication interface and the AC-to-DC converter, and the digital signal processor comprising:
 a phase-locked loop unit receiving the sync signal and performing a phase-locking operation with reference to a corresponding phase offset of a specific ID number to generate a frequency switching signal, wherein
 Fp=sync_ref+1*Fo for the first slave power module with the ID=1,
 Fp=sync_ref+2*Fo for the second slave power module with the ID=2,
 Fp=sync_ref+3*Fo for the third slave power module with the ID=3,
 where Fp is an input signal, sync_ref is the sync signal, Fo is the phase offset; and
 a PWM signal generator connected to the phase-locked loop unit to receive the frequency switching signal and generate a PWM control signal to drive the AC-to-DC converter.

2. The power module system in claim 1, wherein each of the power modules has a specific ID number and the specific ID numbers are provided for a phase offset calculation.

3. The power module system in claim 1, wherein central point of the PWM control signal of each power module is interleaved.

4. The power module system in claim 1, wherein the communication interface is a controller area network interface.

5. The power module system in claim 1, wherein the majority of the power modules are the slave power modules and each of the slave power modules has a specific ID number.

6. A method for operating an interleaved-PWM power module system with at least two power modules, each of the power comprising a specific ID number and a digital signal processor, and the method comprising the steps of:
 (a) setting the power module with an extreme value of the specific ID number as a master power module and setting the remaining power modules as slave power modules;
 (b) sending a sync signal to all of the slave power modules through the master power module;
 (c) performing a phase-locked calculation through the digital signal processor of each slave power modules to output a frequency switching signal from the corresponding slave power module; wherein each of the slave power modules has a different phase offset and the frequency switching signal is synchronized with the sum of the sync signal and the phase offset, wherein
 Fp=sync_ref+1*Fo for the first slave power module with the ID=1,
 Fp=sync_ref+2*Fo for the second slave power module with the ID=2,
 Fp=sync_ref+3*Fo for the third slave power module with the ID=3,
 where Fp is an input signal, sync_ref is the sync signal, Fo is the phase offset; and
 (d) outputting the frequency switching signal to control a corresponding PWM control signal through the digital signal processor of each power module.

7. The power module system in claim 6, wherein a new master power module is re-defined from the remaining unfaulted power modules when the present master power module has a boosting fault.

8. The power module system in claim 6, wherein central point of the PWM control signal of each power modules signal is mutually interleaved.

9. The method for operating the interleaved-PWM power module system is claim 6, wherein the extreme value of the specific ID number is the minimum value of the specific ID number.

10. The method for operating the interleaved-PWM power module system is claim 6, wherein the extreme value of the specific ID number is the maximum value of the specific ID number.

* * * * *